United States Patent [19]

Mori

[11] Patent Number: 5,629,915

[45] Date of Patent: May 13, 1997

[54] DIGITAL SIGNAL CONVERSION ENABLING TO FIND UNAUTHORIZED CHANGE OF THE SIGNAL

[76] Inventor: Ryoichi Mori, No. 1-24-12, Hakusan, Bunkyo-ku, Tokyo, Japan

[21] Appl. No.: 572,720

[22] Filed: Dec. 14, 1995

[30] Foreign Application Priority Data

Dec. 14, 1994 [JP] Japan ................................. 6-333200

[51] Int. Cl.$^6$ .................................................. G11B 7/00
[52] U.S. Cl. ......................................................... 369/59
[58] Field of Search ................................ 369/48, 59, 62; 360/40, 41, 60; 380/4

[56] References Cited

U.S. PATENT DOCUMENTS

| Re. 34,003 | 7/1992 | Weng | 360/72.2 |
|---|---|---|---|
| 4,788,685 | 11/1988 | Sako et al. | 380/4 |
| 5,170,299 | 12/1992 | Moon | 360/51 |

OTHER PUBLICATIONS

IEEE publication title "Modulation and coding for information storage" by Siegel et al pp. 68–86 Dec. 1991.

*Primary Examiner*—Nabil Hindi
*Attorney, Agent, or Firm*—Whitham, Curtis, Whitham & McGinn

[57] ABSTRACT

Bit "0" and bit "1" constituting a digital signal are replaced with extended length binary coded signals. For example, bit "0" of the digital signal is replaced with "011", and bit "1" with "110". The replaced signals are recorded in a non-rewritable recording medium. A bit "0" of the recorded signal does not change a status of the recording medium whereas a bit "1" of the recorded signal changes the status of the recording medium. Unauthorized change of the data recorded in the recording medium can be recognized if the data read on a three-bit basis indicates "111". A header may be additionally recorded in the recording medium to store status of the data recorded therein.

18 Claims, 7 Drawing Sheets

5,629,915

DIGITAL SIGNAL CONVERSION ENABLING TO FIND UNAUTHORIZED CHANGE OF THE SIGNAL

BACKGROUND OF THE INVENTION

1. Field of the Invention

The present invention relates to a method of converting a digital signal to an extended length binary coded signal which enables to easily finding a change of the signal recorded in a non-rewritable recording medium.

2. Description of the Related Art

Characters and numerals are recorded on a recording medium in a binary form by translating the characters and numerals into predetermined binary coded signals. Conventionally, notwithstanding the fact that the digital signals recorded on the recording medium can be easily changed, there has been no means to detect such an occurrence. A serious problem will arise if no one is aware of the unauthorized change of the data stored in the recording medium.

SUMMARY OF THE INVENTION

In view of the foregoing, it is an object of the present invention to improve the reliability of the digitized data.

It is another object of the present invention to afford a checking capability to find whether or not an illegal or unauthorized change of the digitized data was carried out.

To achieve the above and other objects, the present invention provides a method of processing a digital signal, which includes the steps of replacing a bit "0" in the digital signal with a first n-bit length binary coded signal including at least one bit of "0" and also replacing a bit "1" in the digital signal with a second n-bit length binary coded signal including at least one bit of "0" wherein n is an integer equal to or greater than two and wherein the first n-bit length binary coded signal and the second n-bit length binary coded signal are different from each other, and writing in a non-rewritable recording medium the first and second n-bit length binary coded signals in accordance with the bits constituting the digital signal.

A marker having a predetermined meaning may further be written in the recording medium. The marker is assigned with an n-bit length binary coded signal being different from the first and second n-bit length binary coded signals.

Preferably, a bit "0" in a digital signal is replaced with one of three-bit length binary coded signals selected from "001", "110" and "101". Also, a bit "1" in the digital signal is replaced with one of non-selected binary coded signals, whereupon the replaced binary coded signals are written in a non-rewritable recording medium in accordance with the bits constituting the digital signal.

Also, a bit "0" in the digital signal may be replaced with one of two-bit length binary coded signals selected from "01" and "10". Also, a bit "1" in the digital signal may be replaced with non-selected binary codes signals whereupon the replaced binary coded signals are written in a non-rewritable recording medium in accordance with the bits constituting the digital signal.

A bit "0" of the replaced binary coded signals does not change a status of the recording medium when written in the recording medium whereas a bit "1" of the replaced binary coded signals changes the status of the recording medium when written in the recording medium.

To investigate whether or nor the data recorded in the recording medium is changed, the signals written in the recording medium is read on an n-bit basis. Thereafter, it is checked whether or not bits in all digit positions in n-bit signals thus read are "1", whereupon it is determined that the signals in the recording medium have been changed when a result of checking is affirmative.

In accordance with another aspect of the invention, the digital signal containing plural pieces of information is recorded in a non-rewritable recording medium, and a header is further recorded in the recording medium. The header contains at least one of information items regarding a bit length of the digital signal and a number of bits constituting the digital signal.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENTS

Various embodiments of the present invention will be described while referring to the accompanying drawings. The recording medium to be used in the present invention is of a "write once" type in which data can be written only once or of an "overwrite" type in which data can be partially or wholly overwritten in ANDed fashion with respect to the previously written data. The present invention is not applicable to a rewritable type recording medium in which new data can be written in place of the formerly written data.

Figure 1:
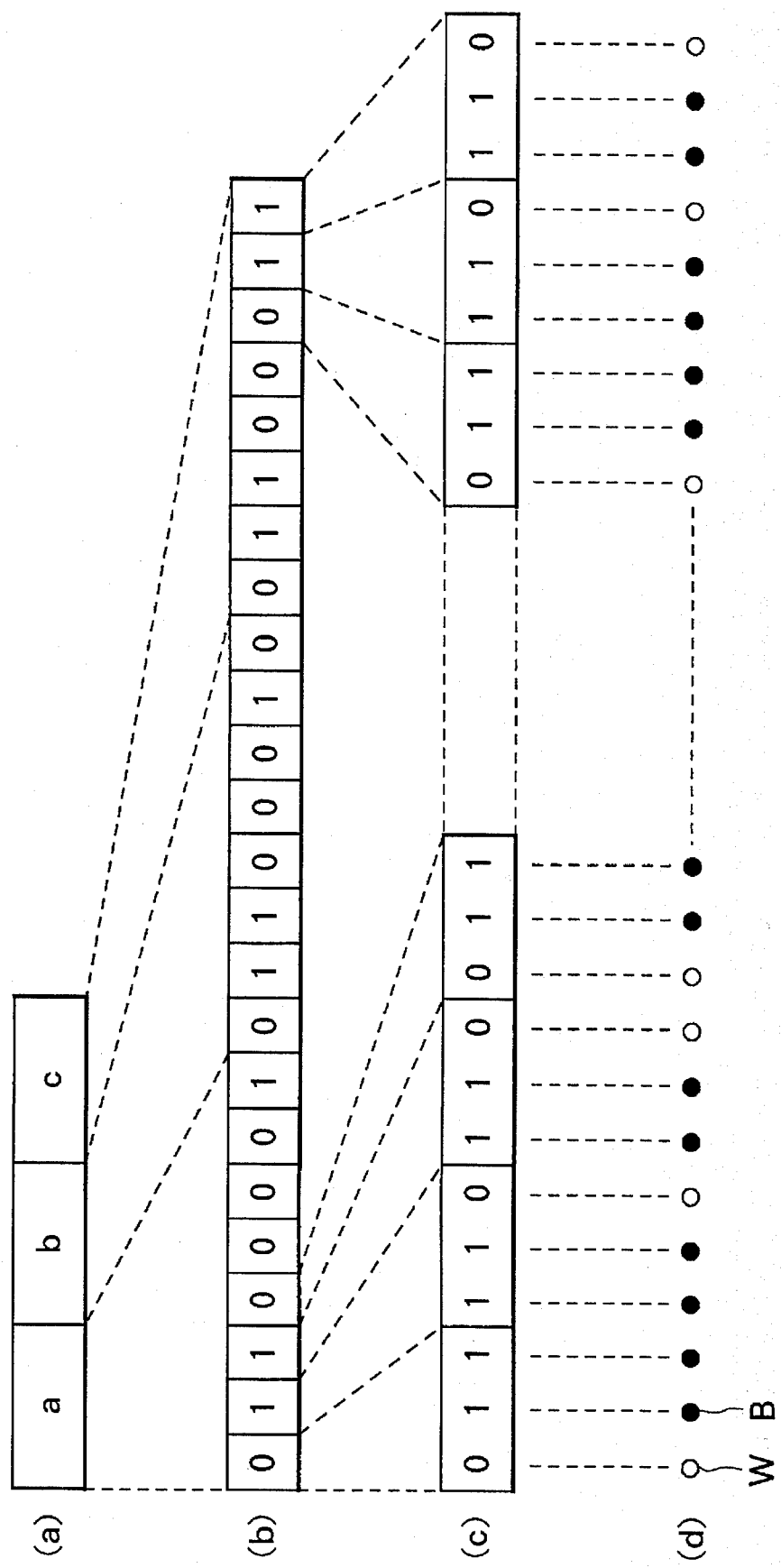
FIG. 1(a–d) is an explanatory diagram for describing a principle of a binary coded recording method according to a first embodiment of the present invention.

FIG. 1 illustrates how a character string of "abc" is digitized and recorded on a recording medium. The 8-bit codes for the characters "a", "b" and "c" according to ANSI (American National Standard Institute) are "01100001", "01100010" and "01100011", respectively. Conventionally, the consecutive three 8-bit codes "011000010110001001100011" are directly recorded on the recording medium. The first embodiment of the present invention records the character data in the recording medium upon replacing each bit of the corresponding ANSI 8-bit code with a predetermined three bit code. That is, each bit of the ANSI 8-bit code is converted to a three times extended length binary coded signal. More specifically, "0" of the ANSI 8-bit code is replaced with "011", and "1" with "110" as shown in part (c) of FIG. 1. The resultant binary coded signal is:

"011110110011 ... 011110110"

and this is recorded in the recording medium. Recording binary digit "1" on the recording medium changes the state of the recording medium whereas recording binary digit "0" does not change the state of the recording medium.

For a fuse type ROM employed as the recording medium, a current is flowed in a fuse to melt it to thus record the bit "1". For a TeC optical disk, a laser beam is irradiated onto the disk to form a pit or groove to thus record the bit "1". For a chromatic type optical disk, a laser beam is irradiated onto the disk to form a blackened portion to thus record the bit "1". Once the bit "1" is recorded on the fuse type ROM, the melted fuse cannot be reinstated to the original state. The pit or the blackened portion formed on the optical disk cannot be reinstated to the original state, either.

If the extended length binary coded (ELBC) data recorded in the recording medium is intentionally changed by an unauthorized person, the ELBC data "011" corresponding to "0" of the ANSI 8-bit code is changed to "111", and the ELBC data "110" corresponding to "1" of the ANSI 8-bit code is also changed to "111". Therefore, whether or not an illegal or unauthorized change of the data has been carried out or the location where the change of the data is carried out can be determined through investigation of the bit pattern on a three-bit basis.

Figure 2:
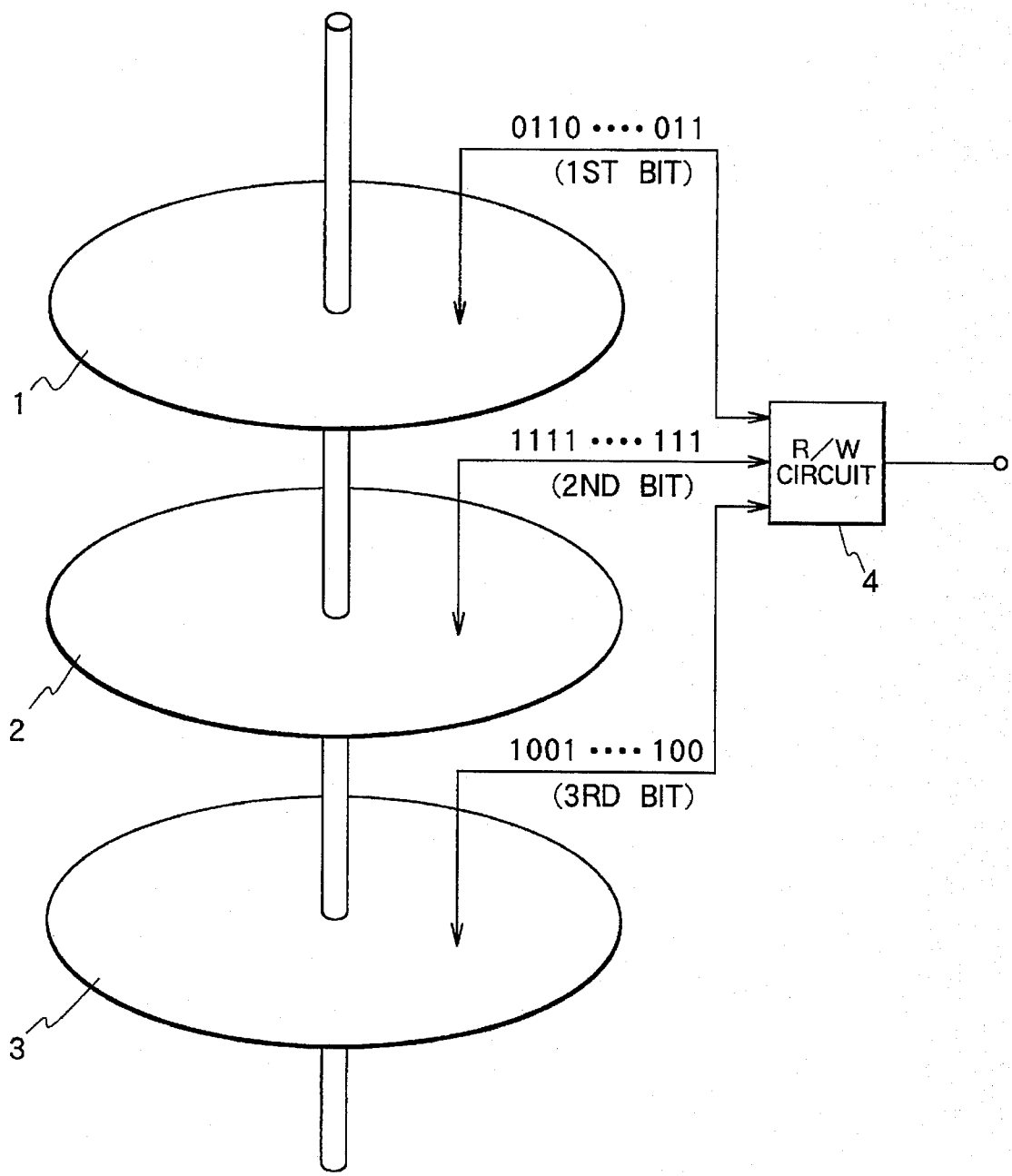
FIG. 2 is a perspective view showing a recording medium on which digitized data encoded according to the first embodiment of the present invention are recorded.

FIG. 2 illustrates a recording disk assembly including three disks 1, 2 and 3 coaxially supported on a rotating shaft. Three-bit ELBC data are recorded in the three disks 1, 2 and 3 at a time in parallel fashion. Specifically, the first digit position data of the three-bit ELBC data is written into and read from the disk 1, the second digit position data of the three-bit ELBC data is written into and read from the disk 2, and the third digit position data of the three-bit ELBC data is written into and read from the disk 3 by means of a read/write (R/W) circuit 4. With the use of the recording disk assembly shown in FIG. 2, reading and writing of the ELBC data can be quickly implemented.

In combining two types of ELBC data, a three-bit data of "101" may be used as a separating marker to be posed between two consecutive blocks of ELBC data. While "001", "010", "100", "111" and "000" cannot be used as three-bit ELBC data, a combination of two of more of those three-bit data can be used as a marker having a specific meaning, such as a mark of certification.

Figure 3:
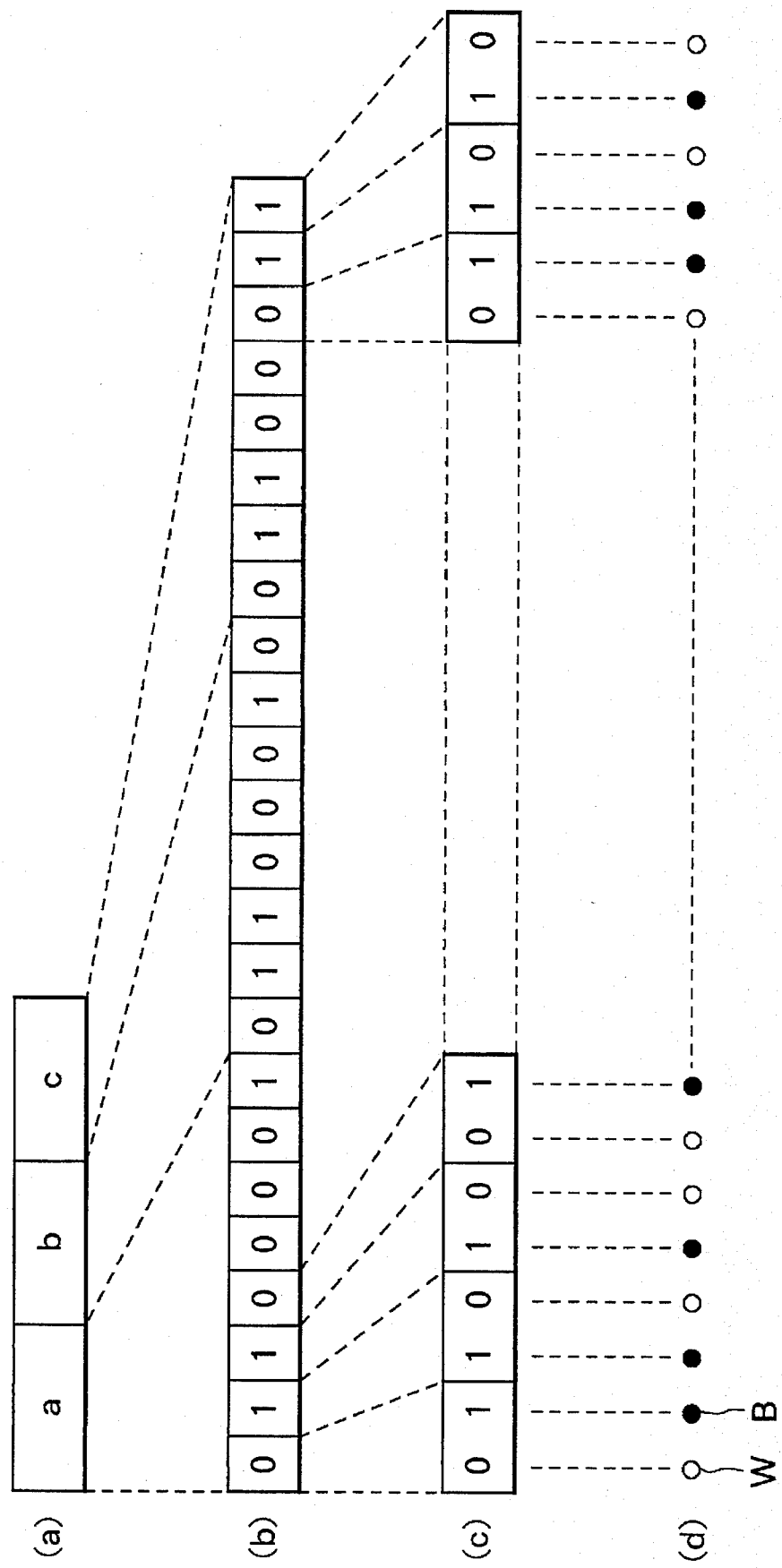
FIG. 3(a–d) is an explanatory diagram for describing a principle of a binary coded recording method according to a second embodiment of the present invention.
Figure 4:
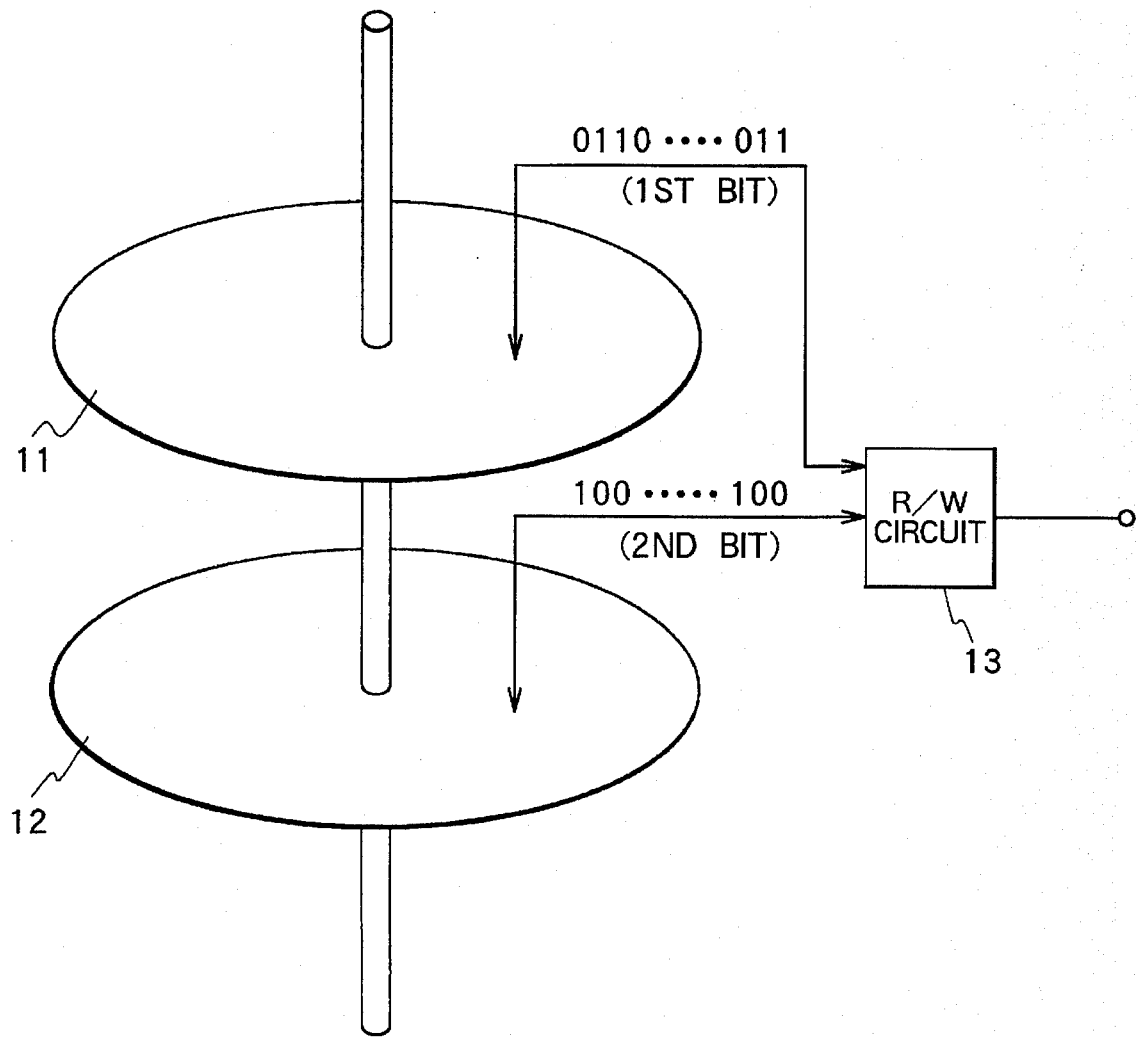
FIG. 4 is a perspective view showing a recording medium on which digitized data encoded according to the second embodiment of the present invention are recorded.

A second embodiment of the present invention will be described with reference to FIGS. 3 and 4. FIG. 3 is similar to FIG. 1 and FIG. 4 is similar to FIG. 2.

The second embodiment of the present invention records the character data in the recording medium upon replacing each bit of the corresponding ANSI 8-bit code with a predetermined two bit code. That is, each bit of the ANSI 8-bit code is converted to a doubly extended length binary coded signal. More specifically, "0" of the ANSI 8-bit code is replaced with "01", and "1" with "10" as shown in part (c) of FIG. 2. The resultant binary coded signal for the character string "abc" is:

"01101001 ... 011010"

and this is recorded in the recording medium.

If the ELBC data recorded in the recording medium is intentionally changed by an unauthorized person, The ELBC data "01" corresponding to "0" of the ANSI 8-bit code is changed to "11", and the ELBC data "10" corresponding to "1" of the ANSI 8-bit code is also changed to "11". Therefore, two consecutive bits of "1" existing in the recorded data tells that the original data is illegally changed.

FIG. 4 illustrates a recording disk assembly including two disks 11 and 12 coaxially supported on a rotating shaft. Two-bit ELBC data are recorded in the two disks 11 and 12 at a time in parallel fashion. Specifically, the first digit position data of the two-bit ELBC data is written into and read from the disk 11, and the second digit position data of the two-bit ELBC data is written into and read from the disk 12 by means of a read/write (R/W) circuit 13. With the use of the recording disk assembly shown in FIG. 4, reading/and writing of the ELBC data can be quickly implemented.

In the second embodiment, a two-bit data of "11" and "00" are not used for the ELBC data but a combination of these two types of two-bit data, e.g. "0011", can be used, for example, as a break point symbol to be posed between two consecutive blocks of ELBC data. In this case, to investigate whether or not the ELBC data is changed by an unauthorized person the ELBC data is read on a two-bit basis- If two consecutive bits of "1" are detected, two consecutive bits in the immediately preceding digit positions are checked if they are both "00". If so, the consecutive four bits "0011" is determined to be a break point symbol. Alternatively, if two consecutive bits of "0" are detected and the subsequent two consecutive bits are "11", then the consecutive four bits "0011" is determined to be a break point symbol. If "00" is detected following the detection of "00", the region corresponding to these four bits is determined to be non-recorded area. Detection of "01" or "10" following the detection of "00" suggests a recording error.

A third embodiment of the present invention will be described with reference to FIG. 5.

In the third embodiment, a header is added to the ELBC data. The header contains information regarding the total length of the ELBC data recorded in the recording medium (or the number of characters), and a number of bit "0" (see part (c) of FIG. 5). The example shown in FIG. 5 contains three characters, therefore binary number "00000011" representing two in decimal notation is added in the first half of the header. Further, the example shown in FIG. 5 contains 14 bits of "0", therefore, "00001110" representing 14 in decimal notation is added in the second half of the header. The ELBC data together with the header is given by:

"0000001100001110 ... 01100011".

Figure 5:
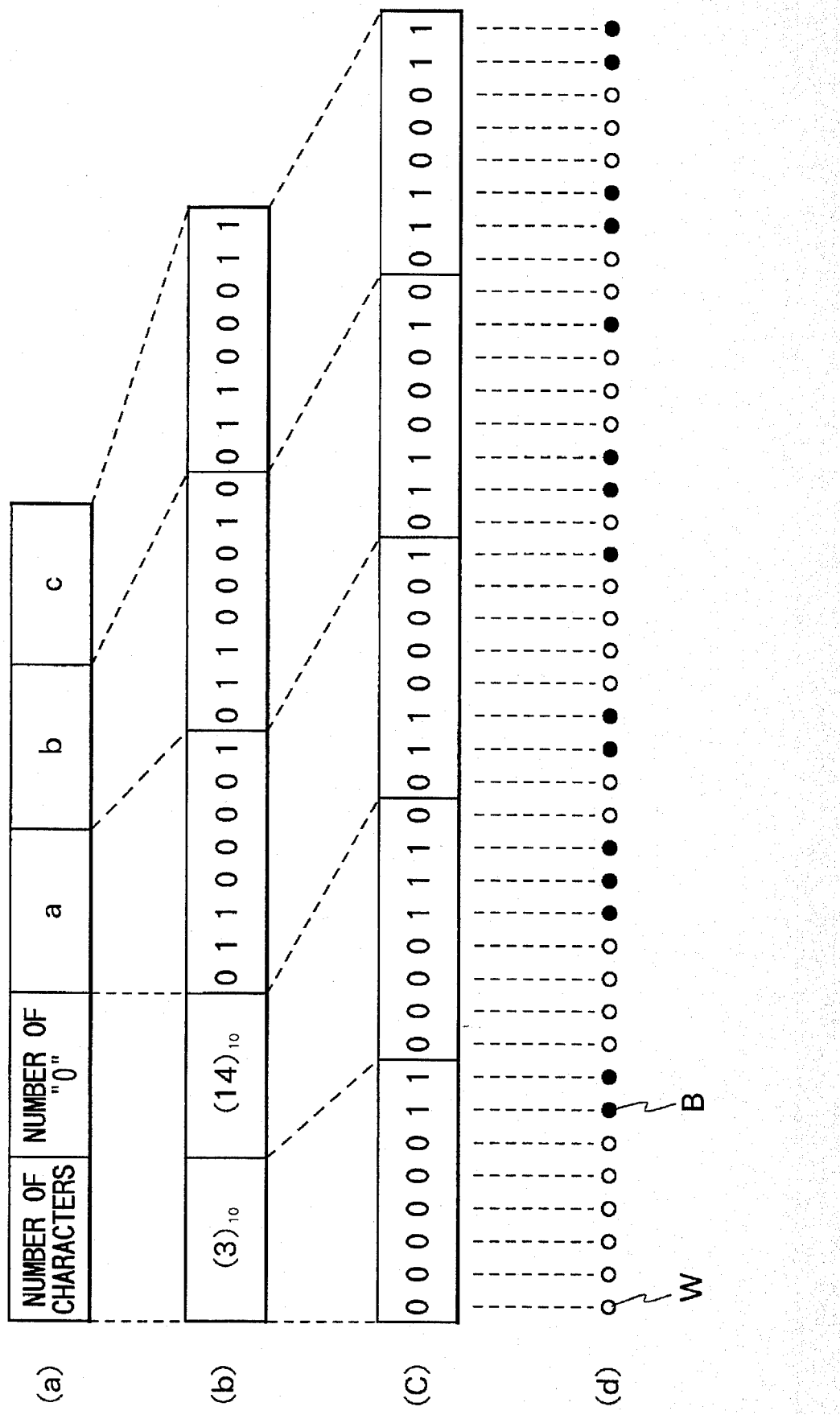
FIG. 5(a–d) is an explanatory diagram for describing a principle of a binary coded recording method according to a third embodiment of the present invention.

The above digital signal is recorded on a recording medium as shown in part (d) of FIG. 5 wherein black dot B indicates recording of bit "1" and a circle W indicates recording of bit "0". The state of the recording medium is changed in the portions where the bit "1" is recorded whereas the state of the recording medium is not changed in the portions where the bit "0" is recorded.

To investigate whether or not the recorded data are illegally changed, the number of bits "0" contained in the recorded data is counted and the counted number is compared with the number written in the header. If these two numbers do not coincide, the data is determined to be changed. In this case, unlike the first and second embodiments, the location where the data is changed cannot be recognized.

In the third embodiment, the header may contain information regarding the number of bit "1" contained in %he binary coded signals recorded in the recording medium.

Figure 6:
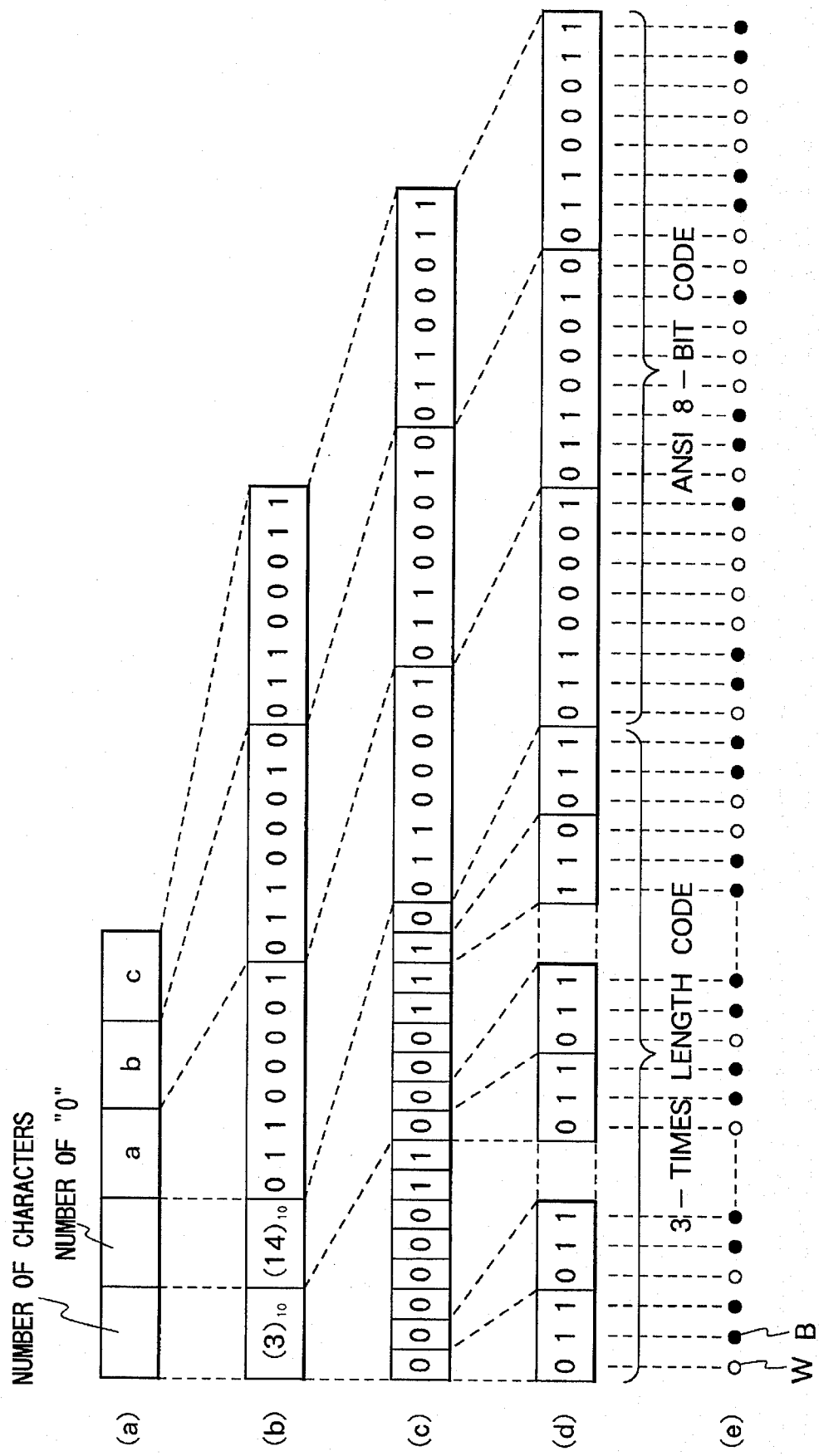
FIG. 6(a–e) is an explanatory diagram for describing a principle of a binary coded recording method according to a fourth embodiment of the present invention.

A fourth embodiment of the present invention is shown in FIG. 6. The fourth embodiment is similar to the third embodiment but differs therefrom in that the header and the ANSI 8-bit digital signals are replaced with three-times extended length binary coded data and the resultant digital signals are recorded in the recording medium. In the third embodiment, the ANSI 8-bit digital signals are not subjected to data conversion but are recorded in the recording medium as they stand. In the third embodiment, change of data in the recording medium may not be discovered if the data contained in the header is changed to agree with the data status which is also changed. In the forth embodiment, however, such a change of data can be discovered.

Figure 7:
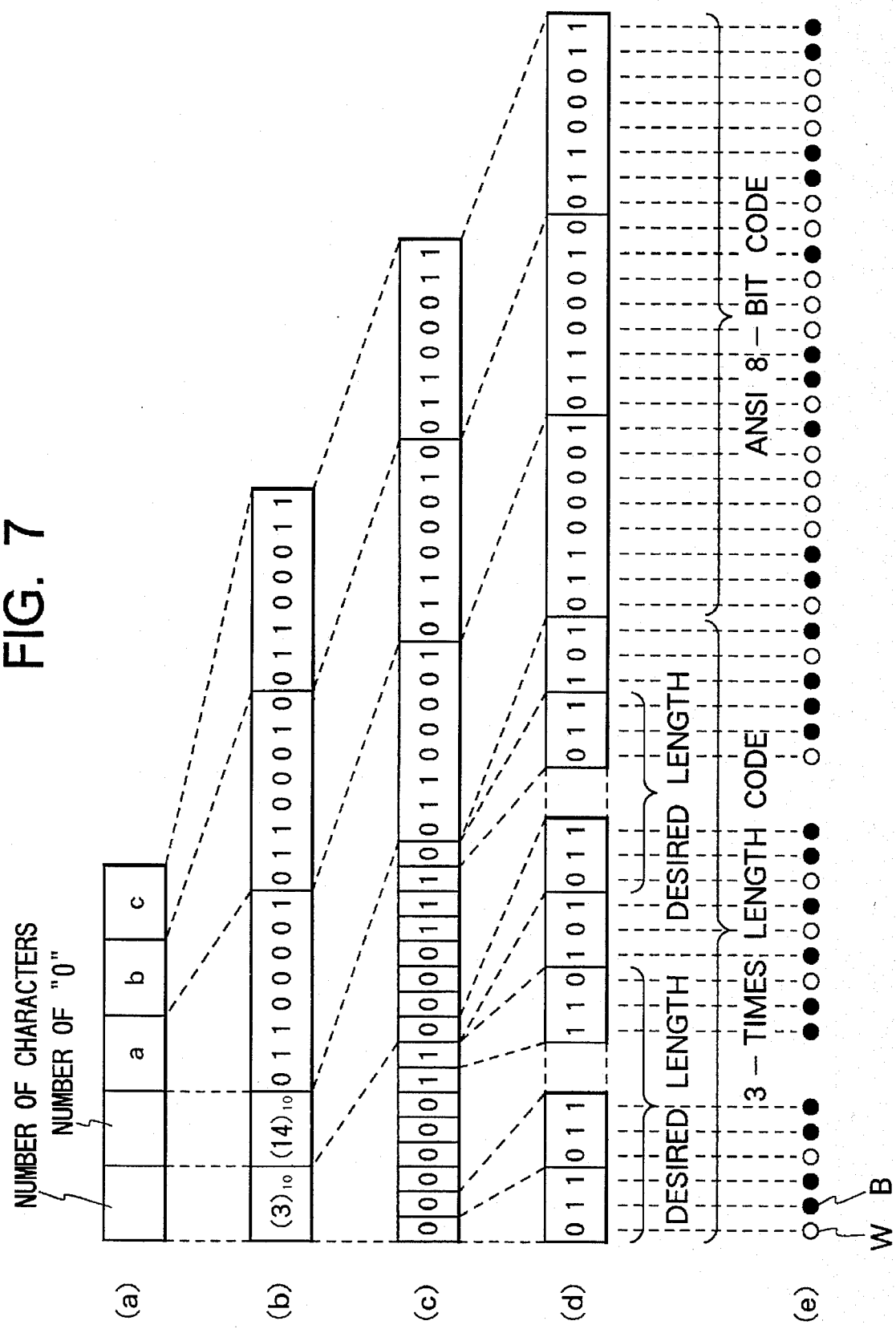
FIG. 7(a–e) is an explanatory diagram for describing principle of a binary coded recording method according to fifth embodiment of the present invention.

A fifth embodiment of the present invention is shown in FIG. 7. The fifth embodiment is similar to the fourth embodiment but differs therefrom in that the data length of the header can be determined as desired. In the fourth embodiment, the header has a fixed data length (24 bits assigned to the information about the number of characters and another 24 bits assigned to the number of bits "0"). In the fifth embodiment, as shown in part (d) of FIG. 7, a three-bit end mark "101" is inserted at the end of the first header information and the same mark is inserted at the end of the second header information. The information contained in the header is sequentially retrieved until the first end mark "101" is detected. The information thus retrieved represents the length of the data stored in the recording disk or the number of characters recorded therein. The information contained in the header is further retrieved until the second end mark is detected. This information represents the number of bits "0".

While various embodiments of this invention have been described in detail, those skilled in the art will recognize that there are many possible modifications and variations which may be made in the exemplary embodiments while yet retaining many of the novel features and advantages of the invention. Accordingly, all such modifications and variations are intended to be included within the scope of the appended claims. For example, in the fourth and fifth embodiments, the ANSI 8-bit binary coded data are recorded in the recording medium as they stand, recording of the data may be effected upon replacing each bit of the ANSI binary coded data with doubly or three-times extended length binary coded signals. Further, it has been described that each character is represented by an 8-bit signal, it may be represented by a 5-bit, 7-bit or 9-bit signal or by another coding format.

What is claimed is:

1. A method of processing a digital signal, comprising the steps of:

replacing a bit "0" in the digital signal with a first n-bit length binary coded signal including at least one bit of "0" and also replacing a bit "1" in the digital signal with a second n-bit length binary coded signal including at least one bit of "0" wherein n is an integer equal to or greater than two and wherein the first n-bit length binary coded signal and the second n-bit length binary coded signal are different from each other; and writing in a non-rewritable recording medium the replaced binary coded signals in accordance with the bits constituting the digital signal.

2. A method according to claim 1, further comprising the step of writing in the recording medium a marker having a predetermined meaning, the marker being assigned with n-bit length binary coded signal being different from the first and second n-bit length binary coded signals.

3. A method according to claim 1, wherein n is equal to two and wherein one of "01" and "10" is assigned to the first n-bit length binary coded signal and a remaining one of "01" and "10" is assigned to the second n-bit length binary coded signal.

4. A method of processing a digital signal, comprising steps of:

replacing a bit "0" in the digital signal with a first n-bit length binary coded signal including at least one bit of "0" and also replacing a bit "1" in the digital signal with a second n-bit length binary coded signal including at least one bit of "0", wherein n is an integer equal to or greater than two and wherein the first n-bit length binary coded signal and the second n-bit length binary coded signal are different from each other and writing in a non-rewritable recording medium the replaced binary coded signals in accordance with the bits constituting the digital signal, wherein n is equal to two and wherein one of "01" and "10" is assigned to the first n-bit length binary coded signal and a remaining one of "01" and "10" is assigned to the second n-bit length binary coded signal, wherein the recording medium comprises first and second recording disks which are coaxially supported on a rotating shaft, and wherein each of the first and second n-bit length binary coded signals is written in the first and second recording disks such that upper significant bits in the first and second n-bit length binary coded signals are recorded in the first recording disk, and lower significant bits in the first and second n-bit length binary coded signals are recorded in the second recording disk.

5. A method according to claim 1, wherein n is equal to three and wherein one of "001", "110" and "101" is assigned to the first n-bit length binary coded signal and a remaining one of "001", "110" and "101" is assigned to the second n-bit length binary coded signal.

6. A method of processing a digital signal, comprising steps of:

replacing a bit "0" in the digital signal with a first n-bit length binary coded signal including at least one bit of "0" and also replacing a bit "1" in the digital signal with a second n-bit length binary coded Signal including at least one bit of "0", wherein n is an integer equal to or greater than two and wherein the first n-bit length binary coded signal and the second n-bit length binary coded signal are different from each other; and writing in a non-rewritable recording medium the replaced binary coded signals in accordance with the bits constituting the digital signal wherein n is equal to three and wherein one of "001", "110" and "101" is assigned to the first n-bit length binary coded signal and a remaining one of "001", "110" and "101" is assigned to the second n-bit length binary coded signal wherein the recording medium comprises first, second and third recording disks which are coaxially supported on a rotating shaft, and wherein each of the first and second n-bit length binary coded signals is written in the first, second and third recording disks such that lowest significant bits in the first and second n-bit length binary coded signals are recorded in the first recording disk, intermediately significant bits in the first and second n-bit length binary coded signals are recorded in the second recording disk, and highest significant bits in the first and second n-bit length binary coded signals are recorded in the third recording disk.

7. A method of recording a digital signal, comprising the steps of:

recording the digital signal in a non-rewritable recording medium, the digital signal containing plural pieces of information;

further recording a header in the recording medium, the header containing at least one of information items regarding a bit length of the digital signal, and number of bits of a predetermined kind contained in the digital signal, wherein a bit "0" in the digital signal is replaced with a first n-bit length binary coded signal including at least one bits of "0" and also a bit "1" in the digital signal is replaced with a second n-bit length binary coded signal including at least one bit of "0", wherein n is an integer equal to or greater than two, and wherein the first n-bit length binary coded signal and the second n-bit length binary coded signal are different from each other, and the first and second n-bit length binary coded signals are written in a non-rewritable recording medium in accordance with the bits constituting the digital signal.

8. A method of checking a data status in a non-rewritable recording medium, wherein a bit "0" in the digital signal is replaced with a first n-bit length binary coded signal including at least one bit of "0" and also a bit "1" in the digital signal is replaced with a second n-bit length binary coded signal including at least one bit of "0" wherein n is an integer equal to or greater then two and the first and second n-bit length binary coded signals are different from each other and wherein a bit "0" in The first and second n-bit length binary coded signals does not change a status of the recording medium when written in the recording medium whereas a bit "1" in the first and second n-bit length binary coded signals changes the status of the recording medium when written in the recording medium, the method comprising the steps of:

(a) reading the signals written in the recording medium on an n-bit basis;

(b) checking whether or not bits in all digit positions of the n-bit signals read in step (a) are "1"; and (c) determining that The signals in the recording medium have been changed when a result of checking in step (b) is affirmative.

9. A method of checking a data status in a non-rewritable recording medium, wherein a bit "0" in a digital signal is replaced with one of three-bit length binary coded signals selected from "001", "110" and "101" and also a bit "1" in the digital signal is replaced with one of non-selected binary coded signals, and wherein the replaced binary coded signals are written in a non-rewritable recording medium in accordance with the bits constituting the digital signal wherein a bit "0" of the replaced binary coded signals does not change a status of the recording medium when written in the recording medium whereas a bit "1" of the replaced binary coded signals changes the status of the recording medium when written in the recording medium, the method comprising the steps of:

(a) reading the signals written in the recording medium on a three-bit basis;

(b) checking whether or not three-bit signals read in step (a) are "111"; and (c) determining that the signals in the recording medium have been changed when a result of checking in step (b) is affirmative.

10. A method according to claim 9, wherein a marker having a predetermined meaning is further written in the recording medium, the marker being assigned with a three-bit length binary coded signal not selected by the bits "1" and "0" of the digital signal.

11. A method of checking a data status in a non-rewritable recording medium, wherein a bit "0" in a digital signal is replaced with one of two-bit length binary coded signals selected from "01" and "10" and also a bit "1" in the digital signal is replaced with non-selected binary coded signals, and wherein the replaced binary coded signals are written in the recording medium in accordance with the bits constituting the digital signal wherein a bit "0" of the replaced binary coded signals does not change a status of the recording medium when written in the recording medium whereas a bit "1" of the replaced binary coded signals changes the status of the recording medium when written in the recording medium, the method comprising the steps of:

(a) reading the signals written in the recording medium on a two-bit basis;

(b) checking whether or not two-bit signals read in step (a) are "11"; and (c) determining that the signals in the recording medium have been changed when a result of checking in step (b) is affirmative.

12. A method according to claim 1, wherein a bit "0" in said first and second n-bit length binary coded signals maintains a status of the recording medium when written in the recording medium, and wherein a bit "1" in said first and second n-bit length binary coded signals changes the status of the recording medium when written in the recording medium.

13. A method according to claim 1, wherein the step of replacing comprises replacing said bit "0" of the digital signal with a sequence of "011", and replacing said bit "1" of the digital with a sequence of "110".

14. A method according to claim 1, wherein the step of writing includes writing a marker including three-bit data of "101" between consecutive blocks of data.

15. A method according to claim 2, wherein a bit "0" in said first and second n-bit length binary coded signals maintains a status of the recording medium when written in the recording medium, and wherein a bit "1" in said first and second n-bit length binary coded signals changes the status of the recording medium when written in the recording medium.

16. A method according to claim 2, wherein the step of replacing comprises replacing said bit "0" of the digital signal with a sequence of "011" and replacing said bit "1" with a sequence of "110".

17. A method according to claim 2, wherein the step of writing said marker includes a step of providing a three-bit data of "101" as said marker between consecutive blocks of data.

18. A method according to claim 3, wherein the step of replacing comprises replacing said bit "0" of the digital signal with a sequence of "011" and replacing said bit of "1" with a sequence of "110", further comprising a step of writing a marker in the recording medium, said step of writing including a step of providing a three-bit data of "101" as said marker between consecutive blocks of data, and wherein a bit "0" in said first and second n-bit length binary coded signals maintains a status of the recording medium when written in the recording medium, and wherein a bit "1" in said first and second n-bit length binary coded signals changes the status of the recording medium when written in the recording medium.

* * * * *